United States Patent
Jacobson (10) Patent No.: US 10,856,533 B2
(45) Date of Patent: Dec. 8, 2020

(54) ELECTRORECEPTOR SIX SENSES FISHING ATTRACTOR

(71) Applicant: Kenneth R. Jacobson, Lake Stevens, WA (US)

(72) Inventor: Kenneth R. Jacobson, Lake Stevens, WA (US)

( * ) Notice: Subject to any disclaimer, the term of this patent is extended or adjusted under 35 U.S.C. 154(b) by 272 days.

(21) Appl. No.: 15/997,619

(22) Filed: Jun. 4, 2018

(65) Prior Publication Data

US 2019/0364864 A1 Dec. 5, 2019

(51) Int. Cl.
*A01K 85/12* (2006.01)
*A01K 85/01* (2006.01)

(52) U.S. Cl.
CPC .............. *A01K 85/12* (2013.01); *A01K 85/01* (2013.01)

(58) Field of Classification Search
CPC ......... A01K 85/00; A01K 85/12; A01K 79/02
USPC ......................................................... 43/42.19
See application file for complete search history.

(56) References Cited

U.S. PATENT DOCUMENTS

| | | | | |
|---|---|---|---|---|
| 1,943,283 A * | 1/1934 | Beil | ......... | A01K 85/12 43/42.2 |
| 2,708,805 A * | 5/1955 | Garvie | ......... | A01K 85/14 43/42.15 |
| 3,340,643 A * | 9/1967 | Weimer | ......... | A01K 85/10 43/42.12 |
| 4,819,361 A * | 4/1989 | Boharski | ......... | A01K 85/02 43/17.6 |
| 6,243,982 B1 * | 6/2001 | Halterman, Jr. | ......... | A01K 85/00 43/42.2 |
| 6,301,822 B1 * | 10/2001 | Zernov | ......... | A01K 85/01 43/42 |
| 6,564,497 B2 * | 5/2003 | Jackson, II | ......... | A01K 85/01 43/17.1 |
| 8,943,737 B1 * | 2/2015 | Palmer | ......... | A01K 91/06 43/42.19 |
| 2005/0039373 A1 * | 2/2005 | Essad | ......... | A01K 85/00 43/42.19 |
| 2005/0235549 A1 * | 10/2005 | Griss | ......... | A01K 85/00 43/42.06 |
| 2009/0126256 A1 * | 5/2009 | Gregory | ......... | A01K 85/12 43/42.09 |

(Continued)

FOREIGN PATENT DOCUMENTS

JP 2007049945 A * 3/2007

*Primary Examiner* — Magdalena Topolski
*Assistant Examiner* — Shada Mohamed Alghailani
(74) *Attorney, Agent, or Firm* — Christopher Mayle; Thomas E. LaGrandeur; Bold IP, PLLC (57) ABSTRACT

A fishing attractor that communicates through a fish's electroreceptor lateral line that is used in water to attract nearby fish by appealing to the fish's six senses. The fishing attractor includes a wire shaft, a copper bead, a propeller having one or more blades and a central portion with a first magnet inside and a second magnet arranged in reverse polarity to the first magnet. Embodiments include a fishing attractor that when moved, the blades of the propeller begin to rotate and the copper bead and propeller move in a linear motion as well causing the first magnet to rotate and move up and down along the wire shaft, producing an electric potential pulse from the electromagnetic field created by the first and second magnets in opposing relation and from exciting electrons in the wire.

17 Claims, 4 Drawing Sheets

(56) References Cited

U.S. PATENT DOCUMENTS

| | | | |
|---|---|---|---|
| 2014/0283434 A1* | 9/2014 | Teegarden | A01K 85/10 43/42.09 |
| 2015/0201593 A1* | 7/2015 | Prantl | A01K 85/00 43/42.29 |
| 2019/0059343 A1* | 2/2019 | Erlendson | A01K 65/00 |

* cited by examiner

ELECTRORECEPTOR SIX SENSES FISHING ATTRACTOR

FIELD OF DISCLOSURE

The field of disclosure is generally directed to an electroreceptor six-senses fishing attractor. More particularly, the invention is directed to an electroreceptor six-senses fishing attractor that exhibits electric potential created by fish shaped propeller blades with a magnet inserted inside that moves in a linear motion along and rotatably around a copper wire in a space created by the reverse polarity of a second magnet positioned on the copper wire that produces an electric potential from the electromagnetic field created by the opposing magnets and from exciting copper electrons in the wire, detectable by a fish's electroreceptor lateral lines, attracting the fish to the fishing attractor or a trailing bait or scented lure, thinking they are prey.

BACKGROUND

Since early history, fishing lures have been used as a type of artificial fishing bait designed to attract a fish's attention. The concept comes from the realization by fishermen that fish are in fact intelligent beings capable of using all their senses to determine and establish their environment. When a fish feels, hears, sees or smells a fishing lure resembling a naturally occurring food, which sometimes can even be smaller fish, the fish become instinctively drawn to the lure. Fishing lures are typically attached to an end of a fishing line and are designed to use movement, flashing, shape, color, and vibration to grab the attention of the fish to bite on a hook attached to the fishing lure.

Fishing lures commonly sold today attract fish using a fish's five senses of smell, sight, touch, taste, and hearing. Most lures mimic the look, feel, and movement of fish, having a lifelike appearance to stimulate or resemble a natural food source of a target fish. Some fish attractors emit sounds and vibrations to provoke the fish's curiosity. Sound is louder and carries four times faster in water than in the air and can help fish locate the vibrations produced by sound even before they see it. Some fish attractors use smell to entice fish to seek out the smell of the lure. Fish can pick up smells in the form of chemical signals by pumping water through their olfactory system into chambers lined with sensory pads via tiny hairs called cilia or by muscular movement. When the sensory pads in the chambers pick up these chemical signals, they transmit them to the fish's brain, which interprets the signals and stimulates the fish to respond appropriately. If the chemical signal is food the fish will begin to pursue the food. Some fishing lures use specific tastes that fish find desirable so that the fish will not spit out the lure once they try to ingest something that feels unnatural to them or has a negative taste.

Notably, fish are most reliant on a sixth sense, "force", above all the other senses. Sea salt and other solid particles in water release positive and negative ions that create an electric field in the water. In these types of environments, any muscle movement creates an electric field greater than the ambient electric field in the water. Fish, using "force", can sense these fields at a great distance and are able to distinguish electric fields created by the ocean ground floor, plant life, food, and predators. While other lures and attractors mentioned above are able to provide some elements to lure fish to the bait, they do not stimulate a fish's "force" by creating an electrical signal as well as attracting fish using their other five senses. Therefore, there is still a need for an innovative fishing attractor used for imitating prey, fish, or other creatures to attract nearby fish using all six senses.

SUMMARY

It is an object of the present description to communicate a fishing attractor configured to attract a fish using electroreception (a.k.a. electroception). In one or more exemplary embodiments, the fishing attractor includes a copper wire having a longitudinal axis, a first end and a second end. A fishing attractor, in one embodiment, further includes a propeller having a central portion and one or more blades, the propeller having an aperture through the central portion through which the copper wire projects. The propeller may be adapted for rotational motion up and down and around the longitudinal axis of the wire and also may be adapted for linear motion along the longitudinal axis of the wire of a first magnet that is included in the fishing attractor. The fishing attractor may further include a second magnet in one or more embodiments.

The first magnet and second magnet may each have an aperture through which the copper wire projects, whereby the first magnet is positioned inside of the central portion of the propeller, the first magnet rotating and moving in harmony with the propeller, whereby poles of the first magnet and second magnet facing each other are of the same polarity creating an repelling magnetic field. In one embodiment, when the fishing attractor moves, the propeller and first magnet move in a rotational motion up and down and around the longitudinal axis of the copper wire and in a linear motion along the longitudinal axis of the wire, exciting the copper electrons in the wire and producing an electric pulse, thus attracting fish in water who may perceive the fish attractor to be a life form. The fishing attractor may further include a scented lure, which appeals to a fish's sense of smell.

It is an object of the present description to provide a method of attracting fish with a fishing attractor, the method including connecting a fishing line to an fishing attractor, the fishing attractor including a copper wire having a longitudinal axis, a first end and a second end, a first eyelet at the first end for connecting the fishing line to the fishing attractor, a propeller having a central portion and one or more blades, the propeller having an aperture therein through the central portion which the wire projects, the propeller adapted for linear motion along the longitudinal axis of the wire and for rotational motion around the longitudinal axis of the wire, a first magnet and a second magnet, the first magnet and second magnet having an aperture therein through which the wire projects, the first magnet positioned inside of the central portion of the propeller, the first magnet rotating and moving in harmony with the propeller; whereby poles of the first magnet and second magnet facing each other are of the same polarity creating a repelling magnetic field; setting the fishing attractor in water; moving the fishing line, causing the propeller and first magnet to rotate and move around and up and down the longitudinal axis of the wire and move in a linear motion along the longitudinal axis of the wire, producing an electric pulse, thus attracting fish perceiving the fish attractor as a life form.

It is an object of the present description to provide a fishing attractor whereby a scented lure is secured to the bottom eyelet of the fishing attractor at a distance of six to twelve inches behind the fishing attractor whereby the fish will also be attracted by the sense of smell.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items," may indicate the presence of only one item, or may indicate more items. Thus, the term "set" may be equivalent to "one or more" as used herein.

In the following detailed description, numerous specific details are set forth in order to provide a more thorough understanding of the one or more embodiments described herein. However, it will be apparent to one of ordinary skill in the art that the invention may be practiced without these specific details. In other instances, well-known features have not been described in detail to avoid unnecessarily complicating the description.

The present disclosure recognizes the unsolved need for a fishing attractor system and method used to create an electric signal by mechanical means to mimic living prey, fish, or other sources that entice fish by communicating with all their senses to approach the fishing attractor, thus increasing the probability that a fish may be caught by a nearby fisherman. In their aquatic environment, fish are equipped with heightened senses and "feel" forces, including the ability to detect electric currents thru their super-sensitive electroreceptor lateral lines that fish naturally possess. Electroreception is useful to fish to detect objects around them, and also to attract them to what may be a potential food source. In a sense, their electroreception ability is a type of sixth sense or "force" and it that allows fish to feel movement, wave-pressure, currents, rock formations, sound, vibrations, magnetoreception, chemoreception, mechanoreception, chemoreception, schooling, prey, and other life forms.

According to one or more embodiments described herein, to fishing attractor is provided that is configured to create an electric signal. The exemplary fishing attracter may be placed in moving water such as a creek, brook, stream, river, or other body, and a fisherman may proceed to shake, twist, stir, pull, or cause the fishing attractor to otherwise move in such a manner that attracts nearby fish by appealing to all of their senses, including using an electric current.

The fishing attractor, according to one or more exemplary embodiments, also communicates with fish using the other senses. Various components of the fishing attractor, in one or more exemplary embodiments, include, but are not limited to, a propeller that is configured to spin, fish shaped blades, a colorful bead, and a trailed bait or scented lure. The spinning of the propeller on the fishing attractor may create various forms of sound, noise, rattling, vibrations, water waves and pressure. The fish shaped blades on the propeller are designed to replicate a "feeding frenzy" of minnows feasting on the colored bead, which in turn, may represent a fish egg. Having these fish shaped blades may appeal to a fish's sense of vision, because fish are typically predators and are attracted to what other fish are eating. A trailed bait or scented lure may also appeal to a fish's sense of smell and taste by creating a scent trail in the water.

Figure 1:
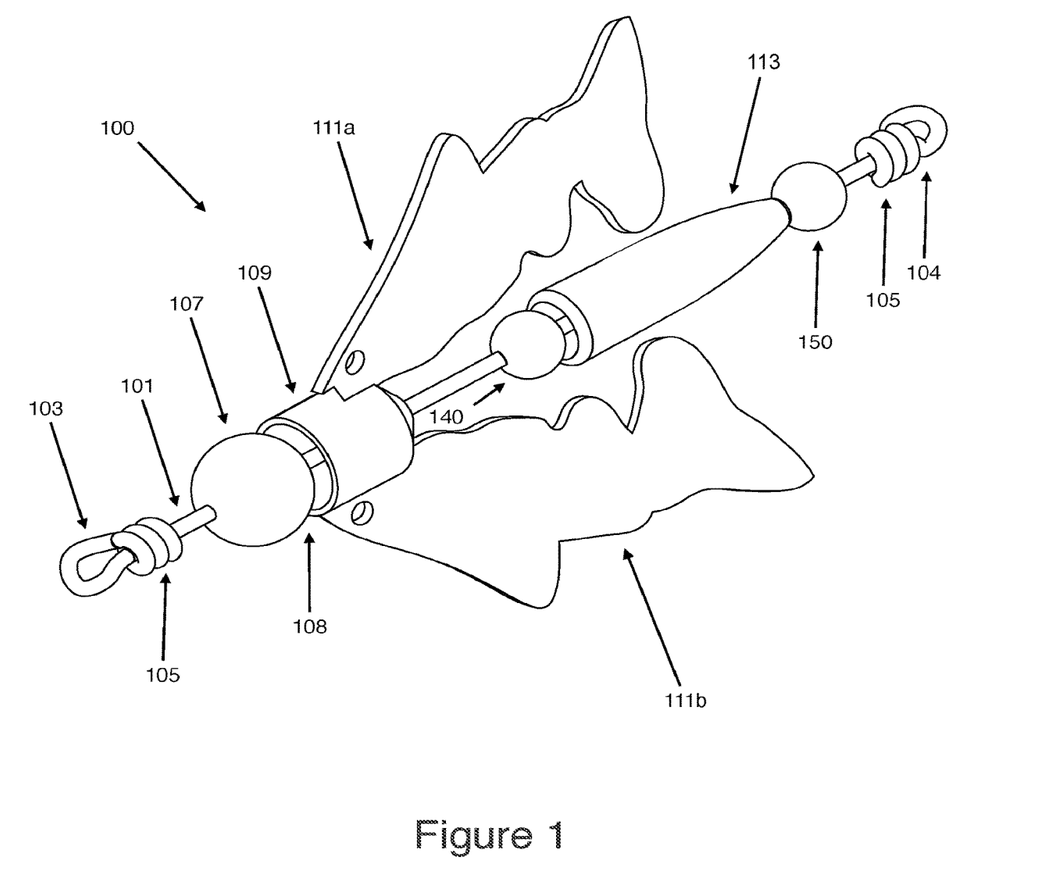
FIG. 1 is a perspective, side-view illustration showing a fishing attractor in accordance with an illustrative embodiment.

FIGS. 1 depicts one non-limiting embodiment of the fishing attractor 100. Fishing attractor 100 includes a wire shaft such as wire shaft 101. Wire shaft 101 includes a longitudinal axis. A first bead such as bead 107 is further located on the longitudinal axis of wire shaft 101. A propeller, such as propeller 108, and a weight, such as weight 113 are also located along the longitudinal axis of wire shaft 101. In one or more exemplary embodiments, wire shaft 101 is a copper wire, although alternative materials and/or elements may also be used, including but not limited to, steel, brass, silver, gold, or any other type of metals with electrons that may become excited when in contact with magnets moving along, up and down and around the wire shaft.

Fishing attractor 100 may further include at least two eyelets, such as eyelet 103 and eyelet 104. Eyelet 103 is located at a first end of fishing attractor 100 and eyelet 104 is located at a second end of fishing attractor 100. Eyelets 103 and 104 may be formed at the top and bottom of the wire shaft 101 by creating wire twists such as wire twists 105. However, those of ordinary skill in the art will appreciate that eyelets 103 and 104 may be formed by any method known by those skilled in the art.

In one or more non-limiting embodiments, eyelets 103 and 104 may be affixed to wire shaft 101, by way of example, with fasteners, adhesive, latches, hinges, welding techniques, or any other method known in the art. Top eyelet 103 is configured to allow for fishing attractor 100 to be attached to a fishing line. Thus, in one or more embodiments, top eyelet 103 is connected to the fishing line by an apparatus such as a swivel that helps prevent twisting of the fishing line or, alternatively, top eyelet 103 may be tied directly to a fishing line with a knot. Bottom eyelet 104 allows for fishing attractor 100 to be attached to a hook where it can act as a lure, a scented lure, bait, or other type of contraption. The bottom eyelet 104 may also be connected to a fishing line by a swivel or tied directly with a knot.

Following top eyelet 103 and wire twist 105 on the longitudinal axis of the wire shaft 101, a first bead, such as first bead 107 may be positioned. First bead 107 may include a bore extending through a body of first bead 107. First bead 107 may be slid or otherwise placed onto wire shaft 101. First bead 107 is capable of moving in a linear direction along the longitudinal axis of wire shaft 101 and to also rotate around the longitudinal axis of wire shaft 101, which may be another way of attracting or luring nearby fish who sense the motion of first bead 107 along wire shaft 101 of fishing attractor 100.

First bead 107 may be a colored bead. In one non-limiting example, first bead 107 may be designed to include a color that mimics that of a fish egg, food of a prey, or other type of fish. Those of ordinary skill in the art will appreciate that first bead 107 may be any color as desired. Further, in one or more embodiments, first bead 107 may be made of copper or other type of metal. It is an object of the present embodiment that the movement of magnets (e.g. magnets 120 and 130 shown in FIG. 2A) may excite the electrons in first bead 107. Of course, first bead 107 may be made of any suitable material known in the art other than copper, including, without limitation, plastic, glass, synthetic polymers, or any water impermeable material.

In one exemplary embodiment, weight 113 may be positioned along the longitudinal axis of wire shaft 101 and beneath second bead 140. In one or more non-limiting embodiments, weight 113 is hollow with a copper interior and includes an bore extending longitudinally through a body of weight 113 which wire shaft 101 may pass through. In one or more non-limiting embodiments, the movement of magnets (e.g. magnets 120 and 130) along wire shaft 101 may excite the electrons in weight 113. Weight 113 is preferably selected to have enough weight whereby fishing attractor 100 both casts easily when cast by a fisherman and also is able to sink quickly into a body of water. The weight selected may vary depending on the size of the fishing attractor; fishing equipment; casting distances, and desired depths, to name a few exemplary considerations.

In one or more embodiments, fishing attractor 100 may include propeller 108 positioned below bead 107 along the longitudinal axis of wire shaft 101. Propeller 108 may have a number of blades, such as blades 111a and 111b. Those of ordinary skill in the art will appreciate that more or less blades than the two shown may be included in alternative embodiments, including one blade, three blades, or any number as desired.

Figure 2A:
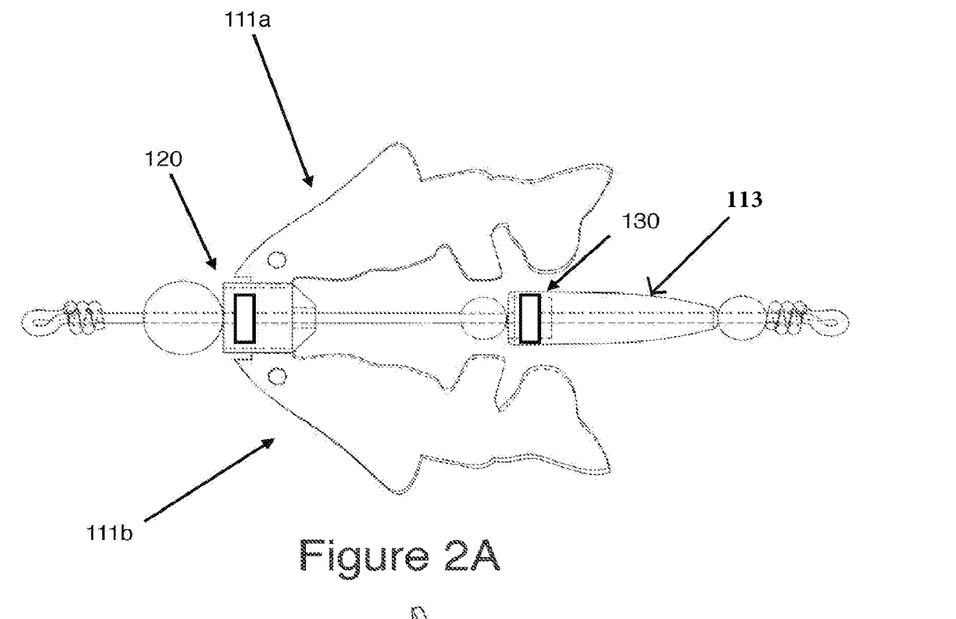
FIG. 2A is a side-view illustration showing the fishing attractor of FIG. 1 in accordance with an illustrative embodiment.
Figure 2B:
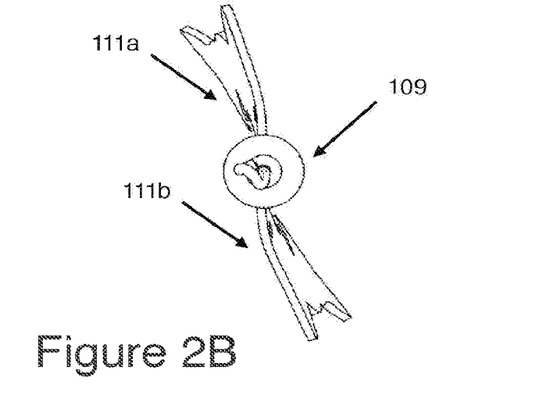
FIG. 2B is a front-view illustration showing the fishing attractor of FIG. 1 in accordance with an illustrative embodiment

As shown in FIGS. 2A, 2B, and 2C, propeller 108 further includes center section 109. Propeller 108 may be preferably made of a plastic material, but may alternatively be made of any other type of desired material, including, without limitation, metal, rubber, silicone, wood, carbon fiber, or other composites. In this exemplary embodiment, blades 111a and 111b are designed having somewhat of a "fish" shape, and are thus described as fish-shaped blades. The design of fishing attractor 100 in this exemplary embodiment is intended to give the impression of two fish that may be fighting for a salmon egg (e.g. because first bead 107 and second bead 140 both look like an egg). Thus, fishing attractor 100 has another functional design element (such as fish shaped blades) that may beneficially have the effect of luring other nearby fish.

In other embodiments, propeller 108 may be made having various colors, sizes, shapes, and may also have realistic details to mimic different and specific types of fish species, parts of the environment, or other factors that may help to attract the fish to fishing attractor 100. In other non-limiting embodiments, blades 111a and 111b may be asymmetrical to one another and may not be of the same size and shape. Further, blades 111a and 111b may also be painted in a neon color or other vibrant colors (without limitation) to further attract fish as well as to increase the visibility of fishing attractor 100 for the corresponding fisherman.

Figure 3:
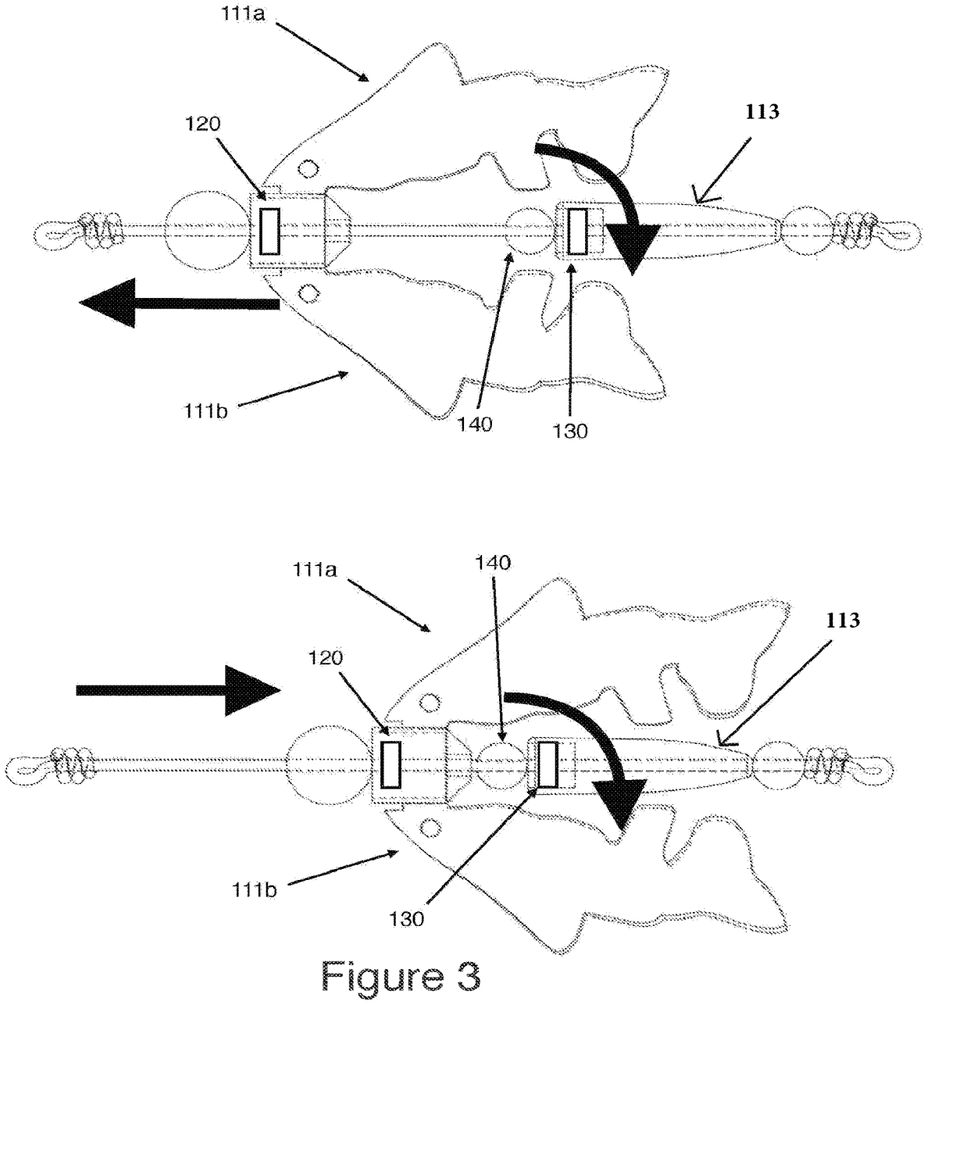
FIG. 3 is a side-view, illustration showing the manner in which a propeller and a bead included in the fishing attractor rotates around the longitudinal axis of the wire shaft and moves in a linear motion down the longitudinal axis of the wire shaft in accordance with an illustrative embodiment.

Center section 109 has a longitudinal axial bore through which wire shaft 101 may pass through so blades 111a and 111b may spin about the longitudinal axis of wire shaft 101, and propeller 108 may move in a linear motion along the longitudinal axis of wire shaft 101. FIG. 3 illustrates the rotational movement of blades 111a and 111b around the longitudinal axis of the wire shaft 101 and linear motion of bead 107 and propeller 108 along the longitudinal axis of the wire shaft. Blades 111a and 111b are positioned at an angle with respect to center section 109 and are positioned symmetrically around center section 109 to achieve balance when fishing attractor 100 moves through water. Blades 111a and 111b are generally planar in shape and extend downward on the longitudinal axis of wire shaft 101. The length of blades 111a and 111b are preferably chosen to cover wire shaft 101 on the longitudinal axis until reaching around the center point of weight 113, but those of ordinary skill in the art will appreciate that blades 111a and 111b may be designed having any suitable length. Blades 111a and 111b are placed at an angle to keep blades 111a and 111b close to the wire shaft 101 and to weight 113 without touching weight 113, and may further help the blades 111a and 111b to spin when fishing attractor 100 is moved even a slight amount.

As shown in FIG. 2A, fishing attractor 100 includes a top magnet such as top magnet 120 located in center portion 109 of propeller 108 and a bottom magnet such as bottom magnet 130 located in the hollow cavity of weight 113. In some embodiments, bottom magnet 130 may be located above or below weight 113 on the longitudinal axis of the wire shaft. Magnets 120 and 130 may be cylindrical disc in shape but in some non-limiting embodiments, magnets 120 and 130 may be designed having a cube, horseshoe, sphere, rod, ring, or any other shape. Magnets 120 and 130 may have a longitudinal axial bore through which wire shaft 101 may pass through.

In some non-limiting embodiments, center portion 109 of propeller 108 and weight 113 have a moisture impervious enclosure preferably comprised of a durable moisture impervious material to protect magnets 120 and 130 from moisture and resulting corrosion. In one or more non-limiting embodiments, magnets 120 and 130 may be positioned outside of the center portion of propeller 108 and weight 113. In other non-limiting embodiments, magnets 120 and 130 may be housed in a separate component along wire shaft 101.

In one preferred, yet non-limiting embodiment, magnets 120 and 130 are neodymium magnets. Neodymium magnets or NIB magnets are a type of rare-earth magnet, and are a permanent magnet made from an alloy of neodymium, iron, and boron to form the Nd2Fe14B tetragonal crystalline structure. These type of magnets are very strong in comparison to their mass so they can be used to hold much larger items in place. In other embodiments, magnets 120 and 130 may be made from samarium cobal (SmCo), Alnico, and ceramic, or any other composition of materials known in the art.

Magnets 120 and 130 may be aligned in opposite polarity so that the North and South poles of magnets 120 and 130 have the North poles aligned facing one another while in other embodiments, the South poles may be aligned facing one another. This repelling magnetic field creates an open space whereby bead 107 and propeller 108 and top magnet 120 may freely rotate around the longitudinal axis of wire shaft 101 and move in a linear motion up and down the longitudinal axis of wire shaft 101 when pulled through water.

As shown in FIG. 3, when pulled through the water, the pressure of the water on fishing attractor 100 forces bead 107 and propeller 108 to move down along the longitudinal axis of the wire shaft 101. When the pressure desists or ceases, propeller 108 and bead 107 are forced back up the longitudinal axis of the wire shaft 101 by the repelling bottom magnet 130, as shown in FIG. 3. The linear motion of top magnet 120 along the longitudinal axis of wire shaft 101 creates an electric potential signal by exciting electrons in the copper of wire shaft 101 and by the electromagnetic field created by the opposing magnets 120 and 130. The electromagnetic field further provides a "frictionless" area for blades 111a and 111b to spin. The electric potential signal is perceived by fish as prey, fish, or other life forms.

A second bead, such as second bead 140, may be placed above weight 113 on the longitudinal axis of wire shaft 101 to further secure weight 113 in place and to attract nearby fish. A third bead such as third bead 150 may be positioned below weight 113 along the longitudinal axis of wire shaft 101. In one or more non-limiting embodiments, second bead 140 may provide further electrons to be excited by the up and down and rotational movement and linear motion of top magnet 120 inside central portion 109 of propeller 108 and the electromagnetic field created by the opposing magnets 120 and 130. Second bead 140 may be made of copper (in one non-limiting embodiment) whereby the movement of top magnet 120 around and along the wire shaft 101 may excite the electrons in second bead 140. Alternatively, second bead 140 may be made of silver, gold, and other conductive metals. In alternate embodiments, the second bead 140 may be replaced by a copper coil with three coils wrapped around the longitudinal axis of the wire shaft in a "beehive" shape to further secure weight in place. However, those of ordinary skill will appreciate that the number of coils and the "beehive" shape are exemplary only, and that fishing attractor 100 may have any number of coils with different shapes to secure weight 113 in place. Such coils may also be made of steel, brass, silver, gold, or any other metals with electrons that may become excited.

In further non-limiting embodiments, a scented lure (not shown) may be attached to the fishing attractor 100 at bottom eyelet 104 and may be configured to trail behind fishing attractor 100. In one preferable, but non-limiting embodiment, such a scented lure (not shown) may trail 6 inches to 12 inches behind fishing attractor 100, but any distance of separation may be used that adequately communicates the sense of smell along with the other senses to the fish. Fish primarily find their prey or other life forms by using electromagnetic forces, however, their senses of hearing, touch, sight, smell, and taste are crucial as well to detect their prey. Fishing attractor 100 includes multiple elements that may appeal to all the normal five senses of a fish (e.g. hearing, touch, sight, smell, and taste), and may also appeal to their "sixth sense", which detects electric currents. Connecting a scented lure to a bottom end of fishing attractor 100 may assist in causing the fish comes to investigate fishing attractor 100. As a fish strikes and crushes the attached bait (not shown) or the scented lure, the fish is expecting confirmation of the flavor of the prey by sense of smell as well as taste. Enticing the fish with all six senses greatly enhances the chances of catching the fish.

In one non-limiting method of using fishing attractor 100, a fisherman on a boat or standing near a body of water connects a fishing line to fishing attractor 100 and casts fishing attractor 100 into the water. The fishing line may be wound around a spool where the spool is a part of reel connected to a fishing rod, whereby the fishing line may be strung on the fishing rod. The fishing line may then be connected to fishing attractor 100 by an apparatus such as a swivel that helps prevent twisting of the fishing line or may be tied directly to top eyelet 103 of fishing attractor 100 by being tied into a knot around top eyelet 103. The fishing line may then be tied with one or more knots if additional securing is needed. The excess fishing line may then be cut off, whereby the loose end of the fishing line is in near proximity to the knot but not so close that the knot breaks.

The fishing rod then may be flicked back and forth, casting the line and fishing attractor into water whereby then the body of water may naturally push, pull, or spin, the fishing attractor causing blades 111a and 111b on the fishing attractor 100. Further, a fisherman may cause fishing attractor 100 to move by rotating, flicking, jerking, or otherwise manipulating the fishing rod through the water, thus causing blades 111a and 111b on fishing attractor 100 to rotate. When pulled through the water, the pressure of the water on fishing attractor 100 forces first bead 107 and propeller 108 to move down along the longitudinal axis of the wire shaft 100, then when the pressure desists or ceases, propeller 108 and first bead 107 are forced back up the longitudinal axis of the wire shaft 101 by the repelling bottom magnet 130 located within weight 113. The movement of top magnet 140 around and along wire shaft 101 excites the copper electrons in wire shaft 101 creating an electric signal by exciting electrons in the copper of wire shaft 101 and from the electromagnetic field created by opposing magnets 120 and 130. The electromagnetic field provides a "frictionless" area for the blades 111a and 111b to spin. The electric potential signal is perceived by fish as prey, fish, or other life forms.

In some non-limiting embodiments a scented lure or other bait (not shown) is connected to the fishing attractor to further attract fish using the sense of smell. The scented lure may be connected to a leader or second line made of monofilament or other suitable material and placed through bottom eyelet 104 of the fishing attractor 100 and then tied into a knot thus securing the fishing attractor to the scented lure. In further non-limiting embodiments, the scented lure may directly be connected to bottom eyelet 104. The scented lure preferably is connected to the fishing attractor whereby the scented lure or bait trails the fishing attractor at some distance (for example, without limitation, six to twelve inches.)

Figure 4:
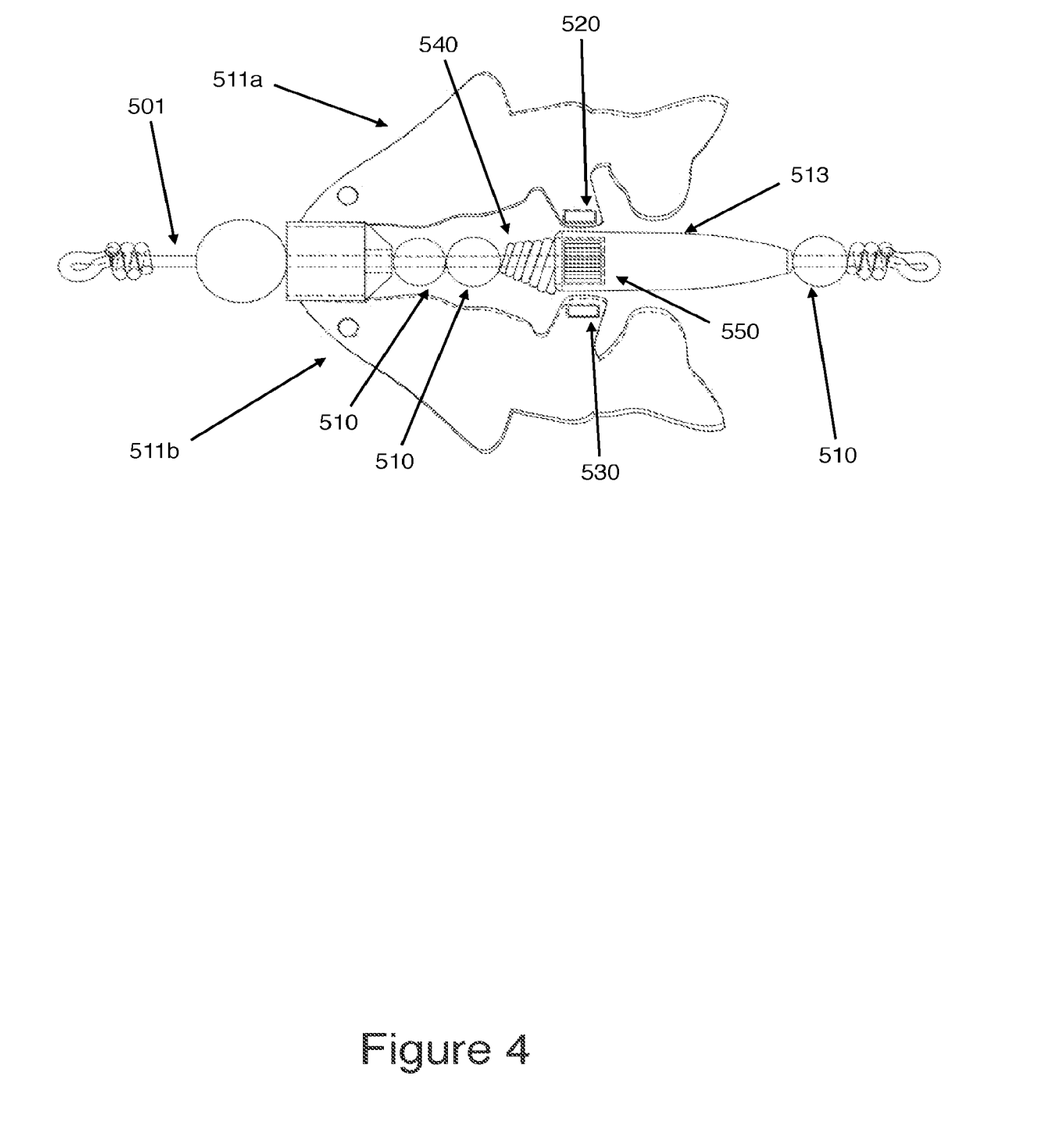
FIG. 4 is a side-view, illustration showing another embodiment of a fishing attractor in accordance with an illustrative embodiment.

In alternative or additional embodiments as shown in FIG. 4, a coil such as cube coil 550 may be positioned in the hollow cavity of the weight 513. Beads, such as beads 150, may be placed on the longitudinal axis of wire shaft 101 to further secure Coil 550. Coil 550 may have a longitudinal axial bore through which wire shaft 501 may pass through. Magnets such as magnets 520 and 530 may be attached to blades 511a and 511b, and positioned at a distance nearest to a point directly above coil 510. Magnets 520 and 530 are aligned in opposite polarity so that the North and South poles of the magnets have the North poles aligned facing one another while in other embodiments have the South poles aligned facing one another. Spinning magnets 520 and 530 around the coil 510 increases the electric potential signal to attract nearby fish as prey, fish, or other life forms. A "beehive shaped" copper-wire-coil such as coil 550 may be positioned slightly increase electric potentials. Coil 510 may be made of copper, in one non-limiting embodiment. Alternatively, other materials and/or elements may also be used such as steel, brass, silver, gold, or metals with electrons that may become excited. Coil 510 is preferably cubic in shape but may be any various shapes of helical coils.

The foregoing description of the invention has been presented for purposes of illustration and description and is not intended to be exhaustive or to limit the invention to the precise form disclosed. Many modifications and variations are possible considering the above teaching. The embodiments were chosen and described to best explain the principles of the invention and its practical application to thereby enable others skilled in the art to best use the invention in various embodiments and with various modifications suited to the use contemplated. The scope of the invention is to be defined by the above claims.

What is claimed is:

1. A fishing attractor, comprising:
a wire having a longitudinal axis, a first end, and a second end; wherein the wire further comprises a first eyelet at the first end of the wire and a second eyelet at the second end of the wire, wherein a bait or scented lure is configured to be secured to the second eyelet and configured to trail at a distance behind the fishing attractor, wherein the fishing attractor is configured to assist in attracting fish to be hooked onto the bait or the scented lure;
a propeller, having a central portion and one or more blades, the propeller having an aperture therein through the central portion which the wire projects, the propeller adapted for rotational motion around the longitudinal axis of the wire and linear motion along the longitudinal axis of the wire, wherein each blade of the one or more blades has a shape and appearance of a fish;
a first bead positioned in front of the propeller, wherein the first bead is configured to move linearly along the wire ahead of the propeller;
a first magnet and a second magnet, the first magnet and second magnet having an aperture therein through which the wire projects, wherein the first magnet is positioned inside of the central portion of the propeller, the first magnet rotating and moving in harmony with the propeller, wherein poles of the first magnet and second magnet facing each other are of the same polarity configured to create an electromagnetic field; and
a weight, wherein the second magnet is positioned inside of a hollow cavity within the weight, wherein the weight is positioned behind the one or more blades of the propeller, wherein the weight has an aperture therein through which the wire projects;
wherein the fishing attractor is configured to produce an electric pulse from the electromagnetic field when the fishing attractor moves through water, and wherein the propeller and first magnet are configured to move in a rotational motion around the longitudinal axis of the wire and in a linear motion along the longitudinal axis of the wire towards the second magnet located in the weight, wherein the one or more blades of the propeller are configured to be repelled by the second magnet located in the weight.

2. The fishing attractor of claim 1, further comprising a second bead positioned in front of the weight, wherein the second bead is also positioned behind the one or more blades of the propeller, wherein the second bead is secured in place in front of the weight.

3. The fishing attractor of claim 2, wherein the first bead and the second bead are configured to resemble a fish egg.

4. The fishing attractor of claim 2, wherein the wire, the weight, the first bead, and the second bead are all made of or include copper, wherein the copper assists in the production of electrons and an electric current when the fishing attractor is located in water.

5. The fishing attractor of claim 1, wherein a hook is attachable to the second eyelet of the fishing attractor.

6. The fishing attractor of claim 1, wherein the one or more blades of the propeller angle away from the propeller and the one or more blades do not touch the weight when the one or more blades are stationary or in motion.

7. The fishing attractor of claim 1, wherein the propeller has three blades having generally right to left symmetry with respect to the aperture of the propeller.

8. The fishing attractor of claim 1, wherein the one or more blades are positioned symmetrically around the center portion of the propeller configured to have a shape of a fish.

9. The fishing attractor of claim 1, wherein movement of the one or more blades having the shape of a fish in water visually replicates a feeding frenzy around the first bead, wherein the first bead resembles a fish egg.

10. A method of attracting fish with a fishing attractor that appeals to multiple senses of the fish, the method comprising:
connecting a fishing line to an fishing attractor, the fishing attractor having a wire having a longitudinal axis, a first end and a second end, a first eyelet at the first end for connecting the fishing line to the fishing attractor, a second eyelet at the second end, and a propeller having a central portion and one or more blades, the propeller having an aperture through the central portion through which the wire projects, the propeller adapted for linear motion along the longitudinal axis of the wire and for rotational motion around the longitudinal axis of the wire, a first magnet and a second magnet, the first magnet and the second magnet having an aperture therein through which the wire projects, wherein the first magnet is positioned inside of the central portion of the propeller, wherein the first magnet rotates and moves in harmony with the propeller, wherein poles of the first magnet and the second magnet facing each other are of the same polarity that create an electromagnetic field,
the fishing attractor further comprising a weight, wherein the second magnet is located within a hollow cavity within a weight, wherein the weight is positioned behind the one or more blades of the propeller and is located along the longitudinal axis of the wire, and is secured in place in front of the second eyelet, the fishing attractor further comprising a first bead that is positioned in front of the propeller having the one or more blades, wherein the first bead is configured to move in a linear direction on the wire, wherein the one or more blades of the propeller are each configured to have the shape of a fish;

setting the fishing attractor in water by connecting the fishing attractor to a fishing line and casting the fishing attractor into the water; and moving the fishing attractor through the water, thereby causing the propeller and the first magnet to rotatably move around the longitudinal axis of the wire and move in a linear motion along the longitudinal axis of the wire towards the weight having the second magnet, wherein upon contact or proximity to the second magnet within the weight, the first magnet is repelled by the second magnet, thus producing an electric pulse from an electromagnetic field created by the first and the second magnet and from exciting electrons in the wire, thus attracting fish perceiving the fishing attractor as one or more life forms, wherein moving the fishing attractor through the water causes the one or more blades having the shape of a fish to rotate and spin along the wire while also moving linearly along the wire, and causes the first bead to move linearly along the wire, thereby attracting the fish to the fishing attractor.

11. The method of claim 10, further comprising connecting a bait or scented lure to the second eyelet, wherein the bait or scented lure trails a distance behind the fishing attractor, wherein the fishing attractor acts to attract the fish to be hooked onto the bait or the scented lure.

12. The method of claim 10, wherein movement of the one or more blades having a shape of a fish resembles a feeding frenzy and acts to further attract the fish to the fishing attractor.

13. The method of claim 10, further comprising, including copper in the wire in order for the wire to produce electrons in the water that further attracts the fish.

14. The method of claim 10, further comprising, positioning the one or more blades symmetrically around the propeller.

15. The method of claim 10, further comprising, positioning the one or more blades so as not to make contact with the weight whether the one or more blades are stationary or in movement in order to allow the one or more blades to spin freely.

16. The method of claim 10, further comprising, providing a second bead disposed in front of the weight to assist in securing the weight in place on the wire and to attract fish to the second bead.

17. The method of claim 10, wherein electric currents are produced in the water as a result of the movement of the first magnet towards the second magnet, wherein the fish are attracted to the electric currents in the water.

* * * * *